United States Patent [19]

Serritella

[11] E Patent Number: Re. 31,650

[45] Reissued Date of Patent: Aug. 21, 1984

[54] NON-SPILLABLE CUP LID

[76] Inventor: James J. Serritella, 2105 Lewis Ave., Rockville, Md. 20851

[21] Appl. No.: 95,200

[22] Filed: Nov. 16, 1979

Related U.S. Patent Documents

Reissue of:

[64] Patent No.: 3,800,999
Issued: Apr. 2, 1974
Appl. No.: 165,611
Filed: Jul. 23, 1971

U.S. Applications:

[63] Continuation of Ser. No. 672,920, Apr. 1, 1976, abandoned.

[51] Int. Cl.[3] ..... B65D 41/46

[52] U.S. Cl. ..... 229/7 R

[58] Field of Search ..... 220/229, 265, 90.2, 220/90.4, 90.6, 266, 217; 215/253, 254, 255; 222/541; 229/43, 7 R, 115 B

[56] References Cited

U.S. PATENT DOCUMENTS

| | | | |
|---|---|---|---|
| 1,026,282 | 5/1912 | Schmitt | 215/254 |
| 1,052,382 | 2/1913 | Schmitt | 215/254 |
| 1,364,375 | 1/1921 | Isaacson | 229/7 R |
| 1,593,785 | 7/1926 | Wilson | 215/253 |
| 2,176,898 | 10/1939 | Fried | 220/27 |
| 2,184,215 | 12/1939 | Geyer | 229/7 R |
| 2,185,180 | 1/1940 | Brennan | 222/541 X |
| 2,375,266 | 5/1945 | Wilson | 229/7 R |
| 2,661,889 | 12/1953 | Phinney | 229/1 B |
| 2,689,664 | 9/1954 | Vingron | 229/7 R |
| 3,301,459 | 1/1967 | Gardner | 229/7 R |
| 3,302,858 | 2/1967 | Miller | 229/7 R |
| 3,366,267 | 1/1968 | Boyer | 220/27 |
| 3,416,687 | 12/1968 | Arnaud | 215/255 |

*Primary Examiner*—Stephen P. Garbe
*Attorney, Agent, or Firm*—Jim Zegeer

[57] ABSTRACT

The disposable lid for a coffee cup or the like has penetrable score lines around the sides of a 90° sectorial portion thereof for easily breaking off this portion to form a drinking access opening therethrough while the remaining portion of the lid serves to reduce the danger of spilling the contents of the cup when held in an unsteady cup support environment. Another penetrable score line extending near the periphery of the lid, between the sides of this sector, and a fold score line between the ends of this peripheral score line provide for a segmental flap to be broken open and bent on the fold score line to form an access opening to the contents of the cup while providing a substantial shield against spilling the contents of the cup through the opening.

15 Claims, 5 Drawing Figures

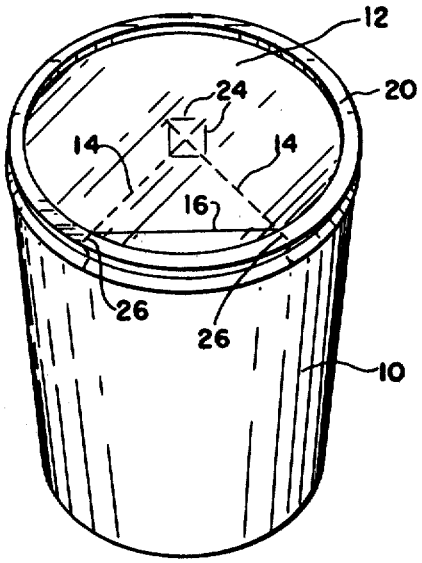
Fig. 1
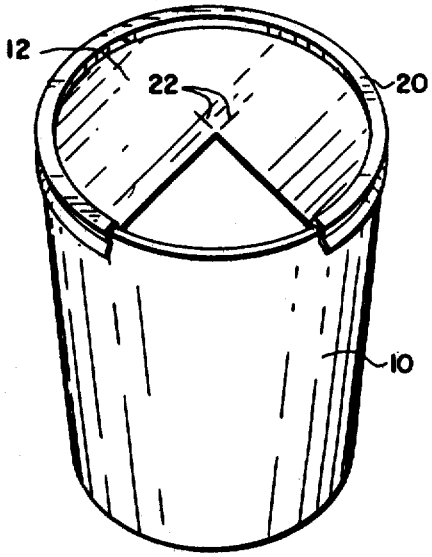
Fig. 2
Fig. 3
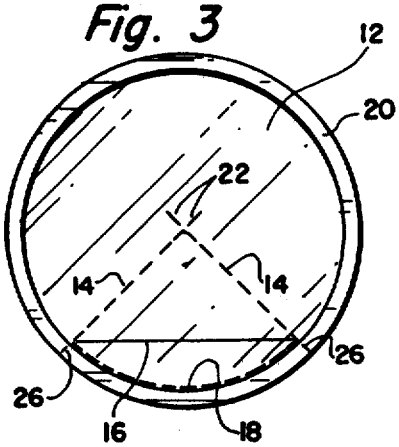
Fig. 4
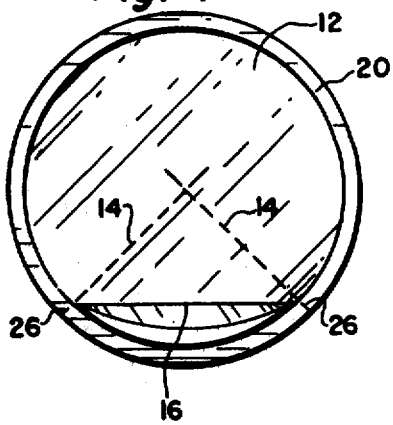
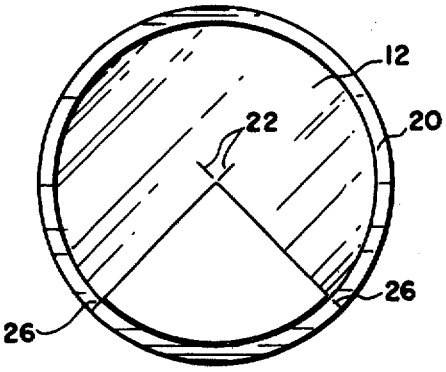
Fig. 5

NON-SPILLABLE CUP LID

Matter enclosed in heavy brackets appears in the original patent but forms no part of this reissue specification; matter printed in italics indicates the additions made by reissue.

*This is a continuation of application Ser. No. 672,920, filed Apr. 1, 1976, now abandoned, which is a reissue of application Ser. No. 165,611, filed July 23, 1971, now U.S. Pat. No. 3,800,995.*

The prior art that was found to be closest to the present invention comprises U.S. Pat. Nos. 2,606,586, 2,689,664, 2,974,815 and 3,504,817. None of these, however, discloses the segmental flap opening at the edge of the lid, subtending an angle of approximately 90°, so as to provide ample space for the upper lip of a user to enter said opening without fully closing it off, and so that the flap when open inwardly provides a baffle to reduce the danger of spilling the contents through said opening. Neither does any of these references show a right angular sectorial opening in the lid broken open inside the rim of the lid, so as to keep the entire rim intact while breaking open either the sectorial portion or just the segmental flap portion.

Accordingly, the main object of this invention is to provide a disposable cover or lid for coffee cups and the like in which a convenient opening may be readily broken out of the lid for unrestricted drinking therefrom while the rest of the lid forms a restrictive shield against the danger of spilling when the cup is held in or on an unsteady support.

A further object is to provide a combination of penetratable and fold score lines in the lid for selective use in accordance with the type of access opening desired by the user.

A further object is to provide a lid with a segmental flap opening adjacent the rim of the cup.

A further object is to provide a sectorial break-off portion in the lid to form a convenient drinking opening therein without removing the lid from the cup.

A further object is to form the sectorial break-off portion inside the rim of the cup so as to keep the edge of the lid intact on said rim when the sectorial portion is broken out.

A further object is to extend the penetrating score lines across each other at the center of the lid to form a penetratable opening for a drinking straw.

Other and more specific objects will appear in the following detailed description of the invention, as illustrated in the accompanying drawing, wherein:

FIG. 1 is a perspective view of a cup with a lid made in accordance with the present invention, FIG. 2 is a perspective view of a cup with a lid as in FIG. 1 but having a sectorial portion removed to provide a convenient drinking opening, FIG. 3 is a plan view of the lid shown in FIG. 1, FIG. 4 is a plan view of the same lid with the segmental flap portion broken through and bent inwardly to provide a convenient drinking opening, and FIG. 5 is a plan view of the same lid with the flap and the rest of the sectorial portion of the lid inside the rim of the cup removed to provide a convenient drinking opening without weakening the mounting of the entire rim portion of the lid on the cup.

In his travels on the Metro-Liner between Washington and New York as well as on other high speed transportation means on water and in the air, the inventor has observed many accidents, some quite serious, which could have been avoided by the use of the present invention, or at least minimized to a great extent.

Many accidents of this type have also been noticed in private transportation means, especially in connection with carry out food services which are becoming more and more popular.

Hot coffee and other drinks are now often served in moving vehicles in many environments where the cup is necessarily held in or on an unsteady support, human or otherwise.

In large crowds even on steady ground, it is almost impossible to avoid getting bumped in the arm holding your drink, and the danger of spilling hot or cold drinks is ever present, and many serious accidents can be avoided by using the non-spillable lids of the present invention.

Besides providing safety against spilling, this invention provides against the danger of dirt or insects entering the cup or other vessel using the present lid, because access to the contents of the vessel or container may be had through a selected reduced opening in the lid while keeping the major portion of the top of the vessel covered. Many food containers may thus be protected against dirt and insects at picnics or on camping trips, etc.

In homes such lids may be used as a training device for children in their early years of motion coordination and drinking.

The present structure of the lids does not limit the manufacturers thereof in the use of impressions of any kind of advertizing or marking of corporate names, etc.

The present type of improved lid could even be made integral with the container which it covers. The combinations of score marks that may be used will give the consumer different options that may be suitable for him under different environments, e.g., a consumer with large physical lips will want to select a larger opening.

Referring now to the drawing, the cup 10 is provided with a lid 12 having penetrable score lines 14 extending from the center of the lid at right angles to each other to the edge of the lid inside the rim of the cup, at which points they are joined by a straight fold score line 16. These points are also joined together by an arcuate penetrable score line 18 inside the rim of the cup, as may be seen in FIG. 3.

The lid 12 has a groove-formed edge 20 fitting closely over the rim of the cup. The penetrable score lines 14 may be extended slightly across each other at the center of the cup, to form a penetrable opening for a drinking straw.

Fold score lines 24 across the triangular flap portions having their apexes at the center of the lid, and defined by the extensions of the penetrable score lines 14 crossing each other at the center.

The penetrable score lines 14 may be extended across the groove-formed edge of the lid 12 at 26 to provide an option of breaking off the entire sectorial portion of the lid, when desired, as shown in FIG. 2.

As shown in FIG. 4, only the segmental flap portion may be broken away at the penetrable score line 18 and bent at the fold score line 16 by pushing it inwardly, to form the segmental drinking opening. Or, if desired, the entire sectorial portion of the lid inside the rim of the cup may be broken out easily by lifting it at the fold line 16 or at the corner between the score lines 14, leaving the sectorial opening , as shown in FIG. 5, without breaking through the groove-formed edge of the lid and weakening its mounting on the rim of the cup.

The operatively easy manipulation of the options in the selection of a suitable opening in the lid of the present invention lends itself toward aiding of the handicapped, epileptics, and other prone situations. The relatively simple construction should appeal to manufacturers, since it requires a minimum of retooling and a minimal increase in costs.

Consumer acceptance should be widespread, nationally as well as internationally.

Many obvious modifications in the form and arrangement of parts of this invention may be made without departing fom the spirit and scope of the invention.

What is claimed is:

1. A lid for a coffee cup or the like, comprising a disc having a groove-formed edge portion extending around its periphery and fitting over the rim of the cup, a fold score line forming the base of a segment of said disc within said edge portion subtending an angle of substantially 90° at the center of the disc, and a penetrating score line extending adjacent said peripheral edge portion, between the ends of said fold score line within said subtended angle.

2. A lid as defined in claim 1, and a pair of penetrating score lines extending from the ends of said fold score line substantially at right angles to each other and meeting substantially at the center of the disc.

3. A lid as defined in claim 2, said right angular score lines extending across said peripheral groove-formed edge of the disc.

4. A lid as defined in claim 3, said right angular score lines crossing over each other to form a penetrable access opening for a drinking straw.

5. A lid for a coffee cup or the like, having a groove-formed edge around its periphery fitting over the rim of said cup, and a pair of penetrating score lines in said disc extending at right angles to each other from the center thereof across said perpheral groove-formed edge, said score lines extending slightly past each other at the center of the disc to provide for the making of an access opening for a drinking straw.

6. A lid for a coffee cup or the like, comprising a thin disc of substantially impervious material having a groove-formed outer edge fitting closely over the rim of said cup, a pair of penetrating scored lines in said disc inside of said groove-formed outer edge and extending from its center at a substantially 90° angle to each other, and an arcuate scored line adjacent said groove-formed outer edge, between the outer ends of said pair of scored lines, so as to make it easy to break a 90° sector piece out of said lid to provide a sector shaped opening in the lid, through which one may drink from said cup, while retaining a major shielding portion of said lid on said cup to minimize accidental spilling of any contents from said cup if it is held in an unsteady support environment.

7. A lid as defined in claim 6, said penetrating score lines extending slightly past said center to provide an opening for a drinking straw at the center when penetrated by pushing the straw therethrough.

8. A lid for a coffee cup or the like, comprising a thin disc of substantially impervious material having a groove-formed outer edge fitting closely over the rim of said cup, a pair of penetrating scored lines in said disc extending from its center at substantially 90° angle to each other and an arcuate penetrating score line adjacent said groove-formed outer edge between and intersecting said scored lines so as to make it easy to break a 90° piece out of said lid to provide a sector shaped opening in the lid through which one may drink from said cup, while retaining a major shielding portion of said lid on said cup to minimize accidental spilling of any contents in said cup if it is held in an unsteady support environment, said penetrating score lines extending slightly past said center to provide an opening for a drinking straw at the center when penetrated by pushing the straw therethrough, said disc having another score line extending between said pair of score lines along and close to the edge of said disc, said sectorial portion between said right angular score lines and said edge score line being adapted to be easily broken out from the lid at said score lines without breaking its rim portion.

9. A lid for a coffee cup or the like, comprising a thin disc of substantially impervious material having a groove-formed outer edge fitting over the rim of said cup, a pair of penetrating scored lines in said disc extending from its center at substantially 90° angle to each other and an arcuate penetrating score line adjacent said groove-formed outer edge between and intersecting said scored lines so as to make it easy to break a 90° piece out of said lid to provide a sector shaped opening in the lid through which one may drink from said cup, while retaining a major shielding portion of said lid on said cup to minimize accidental spilling of any contents in said cup if it is held in an unsteady support environment, said penetrating score lines extending slightly past said center to provide an opening for a drinking straw at the center when penetrated by pushing the straw therethrough, said disc having a fold score line extending between the ends of said edge score line, so that a segmental flap may be broken off at said edge score line and folded down at said fold score line to provide a drinking opening without removing or weakening the lid mounting on the rim of the cup.

10. A container having a top of thin impervious material, a pair of penetrable score lines in said top extending from its center at a substantially 90° angle to each other, to its outer edge, said penetrable score lines crossing each other at the center of the top to provide an opening for a drinking straw when it is pushed therethrough.

11. A container as defined in claim 10, said top having another penetrable score line extending between said pair of score lines along and close to the edge of the top, said sectorial portion between said right angular score lines and said edge score line being adapted to be easily broken out from the top of said container at said score lines.

12. A container as defined in claim 11, said top having a fold score line extending between the ends of said edge score line, so that a segmental flap portion may be broken off at said edge score line and bent down at said fold score line to provide a drinking opening.

*13. A lid for a cup or the like comprising a thin disc, said disc having a peripheral flange formed on its edge around its periphery for frictional engagement with the rim of said cup to form a seal therewith for liquid contained in said cup,*

*an arcuate penetrating score line in said disc having terminal ends bounded by lines extending at an angle to each other from substantially the center of said lid, said arcuate score line extending adjacent said peripheral flange edge, and*

*a fold line formed of a chord of a circle subtending an arc between said terminal ends such that an opening bounded by the arcuate penetrating score line and said chord of a circle form an opening having a segmental flap, which opening is sufficient to permit fluid in said cup to flow substantially unimpeded to the mouth of the user and said segmental flap substantially prevents inadvertent spillage of the contents when said cup is nearly full with a liquid.*

*14. The invention defined in claim 13 wherein there are a pair of penetrating score lines along said lines extending at an angle to each other, the fold line of said segmental flap intersects said score lines at said flange portion of said lid.*

*15. A container having a top of thin impervious plastic material, said top having a rim for frictional engagement with the side walls of said container,*

*a pair of penetrable straight score lines in said top extending from said rim at a selected angle to each other so that the arc subtended thereby forms ample space for the upper lip of the user,*

*an arcuate penetrable score line adjacent said rim extending between said pair of lines,*

*a straight fold line intersecting said pair of penetrating score lines and said pair of penetrating score lines being extended at their interior ends to cross each other proximate the center of the top to provide an opening for a drinking straw when it is pushed therethrough.*

* * * * *